United States Patent [19]

Mulder et al.

[11] Patent Number: 5,327,266
[45] Date of Patent: Jul. 5, 1994

[54] SIMULTANEOUS MULTIPLE EXPOSURE HOLOGRAMS USING COHERENCE MISMATCH TO PREVENT CROSSTALK

[75] Inventors: Jerry L. Mulder, La Crescenta; Kevin H. Yu, Temple City; John E. Wreede, Azusa, all of Calif.

[73] Assignee: Hughes Aircraft Company, Los Angeles, Calif.

[21] Appl. No.: 975,366

[22] Filed: Nov. 12, 1992

[51] Int. Cl.⁵ .................. G03H 1/28; G03H 1/04
[52] U.S. Cl. ................................ 359/24; 359/35; 359/900
[58] Field of Search ............... 359/1, 10, 22, 24, 28, 359/23, 27; 365/216; 356/347, 348

[56] References Cited

U.S. PATENT DOCUMENTS

3,832,026 8/1974 Mottier ............................. 359/28
5,121,231 6/1992 Jenkins et al. ....................... 359/7

Primary Examiner—Loha Ben
Assistant Examiner—John Juba, Jr.
Attorney, Agent, or Firm—L. A. Alkov; W. K. Denson-Low

[57] ABSTRACT

A hologram exposure system for simultaneously exposing a plurality of holograms in a holographic recording layer, including first optical elements for providing a first reference beam and a first object beam that interfere in the holographic recording layer and are coherently matched relative to each other, and second optical elements for providing a second reference beam and a second object beam that interfere in the holographic recording layer and are coherently matched relative to each other but are coherently mismatched relative to the first reference and object beams, whereby the crosstalk holograms formed by interference of (1) the first reference beam with the second object beam, (2) the first object beam with the second reference beam, (3) the first object beam with the second object beam, and (4) the first reference beam with the second reference have reduced efficiencies.

2 Claims, 7 Drawing Sheets

FIG. 3  RBA/OBA FRINGES

FIG. 4  RBB/OBB FRINGES

FIG. 5  RBA/OBB FRINGES

FIG. 6  RBB/OBA FRINGES

FIG. 7  OBA/OBB FRINGES

FIG. 8  RBA/RBB FRINGES

SIMULTANEOUS MULTIPLE EXPOSURE HOLOGRAMS USING COHERENCE MISMATCH TO PREVENT CROSSTALK

BACKGROUND OF THE INVENTION

The subject invention is generally directed to multiple exposure holograms, and more particularly to a technique for simultaneous exposure of a plurality of desired holograms in a single hologram recording layer with coherence mismatch between the respective sets of beams that form the different desired holograms.

In a number of applications such as laser eye protection and head-up displays, it may be desirable to utilize a hologram structure that has a bandwidth that is greater than that typically available from a single hologram. One approach to achieving a wider bandwidth hologram is to utilize a hologram structure having multiple holograms, and it would generally appear that the multiple holograms can be in the same hologram recording layer, or they can be in different layers that are individually exposed and later laminated.

However, recording multiple holograms in a single recording layer presents various problems. If the holograms are exposed simultaneously, interaction between respective sets of exposure beams (i.e., interaction of one beam from one set with one beam from another set) will produce undesirable crosstalk holograms that would reconstruct at unacceptably high intensities. Recording the multiple holograms in a single recording layer pursuant to sequential exposures can be performed with dichromated gelatin (DCG) and silver halide recording materials without significant degradation, but not with a photopolymer. A consideration with successive exposures, however, is the requirement for more handling and for DCG a change of shrinkage factor for the subsequent exposures.

Recording individual holograms on respective recording layers which are later laminated together involves the extra steps and costs associated with lamination and the additional film.

Another approach to the need for wider bandwidth is to artificially broaden the hologram in processing to obtain a wider bandwidth or even two distinct peaks. This requires critical processing for any type of recording material.

SUMMARY OF THE INVENTION

It would therefore be an advantage to provide a technique of simultaneously exposing a plurality of holograms in a single layer of holographic recording material with reduced interaction between the respective reference and object beam sets for the different holograms.

The foregoing and other advantages are provided by the invention.in a technique for simultaneously exposing a plurality of desired holograms in a hologram layer with respective desired hologram reference and object beam pairs. In accordance with the invention, the reference beam and object beam of each desired hologram beam pair are coherent relative to each other, while beams from different desired hologram beam pairs have reduced coherence relative to each other. More particularly, the reduced coherence between beams from different desired reference and object beam pairs is achieved by utilizing a different laser source of the same color for each desired hologram beam pair, or by providing a different path length for each of the desired beam pairs that originate from a single laser source such that the path length difference between beams from different desired hologram beam pairs is greater than the coherence length of the laser source.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

The subject invention is directed to a multiple exposure hologram exposure system wherein a plurality of desired holograms are simultaneously exposed in a hologram recording layer by respective reference and object beam pairs (i.e., each desired hologram is recorded pursuant to its own reference beam and object beam). In accordance with the invention, the reference beam and object beam for each desired hologram are coherently matched relative to each other across the hologram format, while the two beams for each undesired crosstalk hologram beam pair are coherently mismatched relative each other across the hologram format, wherein each crosstalk hologram beam pair is comprised of one beam from one desired hologram beam pair and one beam from another desired hologram beam pair. In other words, the various beams are configured such that the components of each beam pair that produces a desired hologram interfere coherently while the components of each beam pair that produces an undesired crosstalk hologram interfere partially incoherently to form very low contrast fringes.

The coherence match within each desired hologram beam pair and the coherence mismatch within each crosstalk hologram beam pair can be achieved by utilizing a single non-etalon laser source for all desired hologram beam pairs and providing path length match between the beams of each desired hologram beam pair while providing path length mismatch between the beams of each crosstalk hologram beam pair. Alternatively, the coherence match within each desired hologram beam pair and the coherence mismatch within each crosstalk hologram beam pair can be achieved by utilizing a different laser source having an etalon within its cavity for each desired hologram beam pair, wherein the different laser sources have nominally the same wavelength.

Path length match or mismatch of two beams is based on each point within the hologram recording layer at which two light rays of such two beams interfere. Associated with such point is a ray path length difference that is the difference in path lengths of the two interfering rays to such point, wherein such path length difference is measured relative to a convenient common point through which the two rays pass, such as the beamsplitter that splits the non-etalon laser output into the separate beams that ultimately interfere. In accordance with the invention, two interfering beams are matched in path length if the ray path length difference at each point of interference is within the coherence length of the non-etalon laser; and two interfering beams are mismatched in path length if the ray path length difference at each point of interference of such two beams is appropriately greater than the coherence length of the laser such that the efficiency of the resulting crosstalk hologram is below a predetermined level. In other words, the ray path length differences for all of the interference locations that involve the construction beams for a desired hologram are maintained within the coherence length of the laser, while the ray path length differences for all of the interference locations that involve the construction beams for crosstalk hologram are maintained to be appropriately greater than the coherence length of the source laser illumination. As a result of the coherence mismatch within each crosstalk hologram forming beam pair, the positions of constructive and destructive interference of coherence mismatched beams in the recording layer move with time and, depending on the degree of movement result in low contrast or obliterated recorded interference fringes. Low contrast or obliterated interference fringes reconstruct as very dim holograms on playback.

It should be appreciated that while the path length differences of each point of interference in a hologram recording layer cannot be physically measured, the particular exposure set up utilized will generally be capable of being analyzed to determine the largest path length difference for the desired interferences and the smallest path length difference for the crosstalk interferences. For ease of reference, when the beam path length difference or mismatch between two beams is stated to be within the coherence length of the laser source, that means that the ray path length differences for all interference points or locations for such two beams within the recording layer are within the coherence length of the source laser. In similar manner, when the beam path length difference or mismatch between two beams is stated to be appropriately greater than the coherence length of the source laser, that means that the ray path length differences for all interference points or locations for such two beams in the recording layer are appropriately greater than the coherence length of the source laser.

A non-etalon laser used for holography will typically have a nominal coherence length in the range of about 2–10 cm, while a laser having an etalon within its cavity will typically have a nominal coherence length in the range of about 5–50 meters, and thus path length mismatch can be more conveniently achieved with a non-etalon laser.

Appropriate path length mismatch in accordance with the invention is dependent upon the upon the particular non-etalon laser, and the required mismatch is determined empirically, starting for example with a reasonable approximation based on measurement of the fringe contrast characteristic of the particular laser with an interferometer as discussed further herein.

Figure 1A:
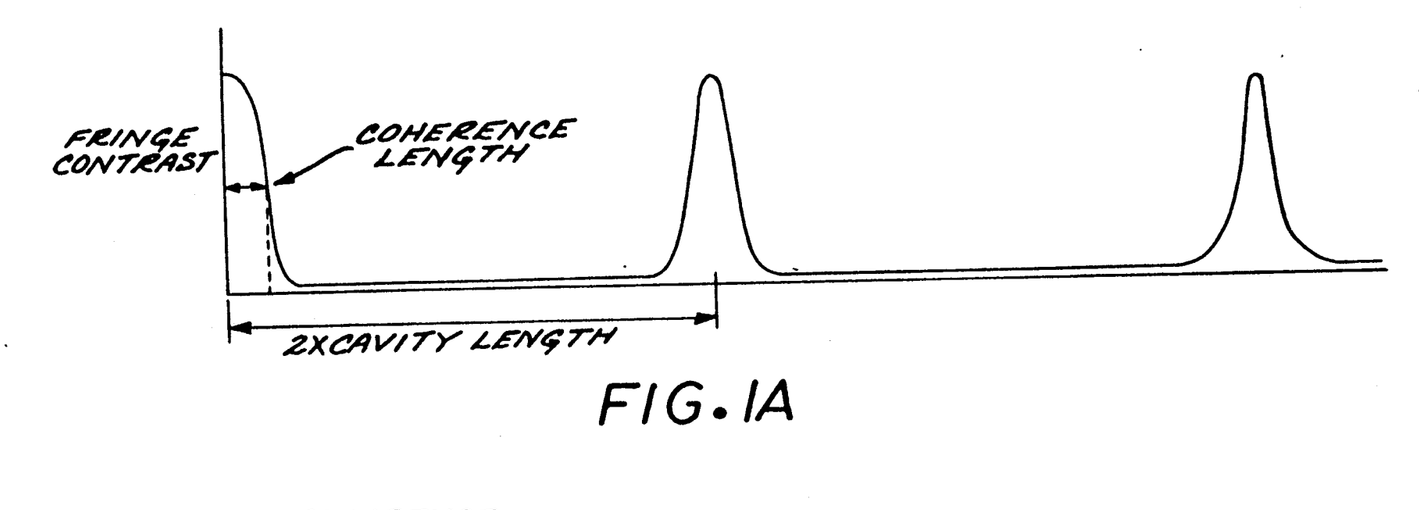
FIGS. 1A and 1B are graphs schematically illustrating hologram brightness as a function of path length difference or mismatch between the hologram forming beams.

FIG. 1A schematically depicts a fringe contrast characteristic that is representative of a non-etalon laser having a longer cavity, such as an argon ion laser. Such a laser would have a coherence length, defined as the shortest path length mismatch that produces a fringe contrast that is 50% of the fringe contrast at 0 mismatch, of about 3 cm, and fringe contrast peaks at intervals equal to about 2 times the cavity length, which would be about 4 meters for a cavity length of about 2 meters, wherein fringe contrast drops to close to 0 at about 6 cm on either side of peaks. By way of illustrative example, a coherence mismatch region of about 364 cm is present between the first peak (at 0 mismatch) and the second peak, if a 12 cm margin is applied inside the bases of the peaks. Due to the somewhat periodic nature of the peaks of the fringe contrast characteristic, the path length mismatches between desired hologram beam pairs should be maintained in the same minimum fringe contrast region, since having mismatches in two different regions may result in a mismatch that is close to one of the fringe contrast peaks.

Figure 1B:
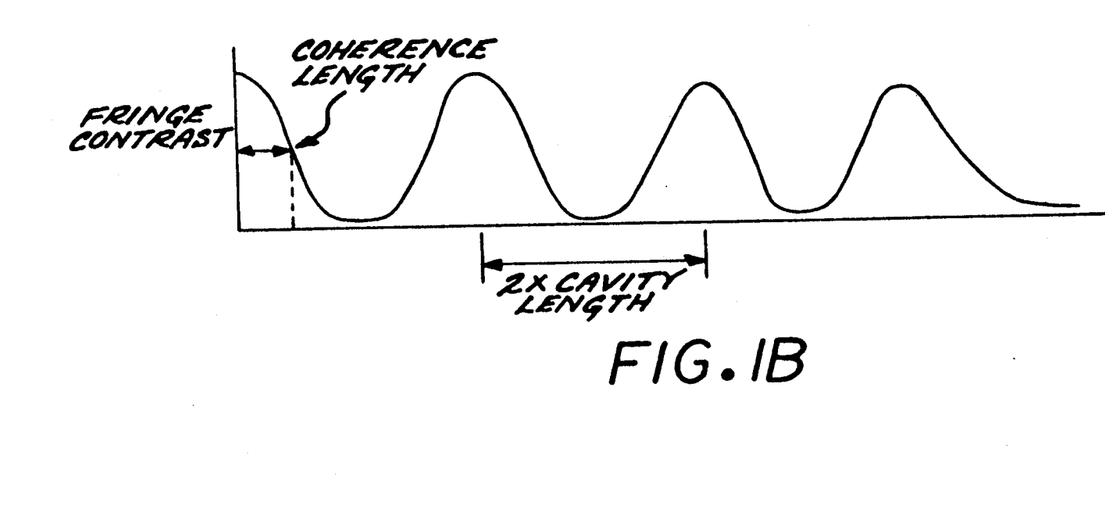

FIG. 1B schematically depicts a fringe contrast characteristic that is representative of a non-etalon laser having a shorter cavity, such as an He/Ne ion laser. Such a laser would have a coherence length Cl of about 2.5 inches and fringe contrast peaks at 10 inch intervals. In view of the close spacing of the fringe contrast peaks, it should be appreciated that the coherence mismatch region between fringe contrast peaks is quite narrow, whereby only two simultaneous exposures can be conveniently made wherein the path length mismatch between the desired hologram beam pairs is at one of the fringe contrast minima that is closer to 0 mismatch. A larger number of mismatches can be achieved by having mismatches that are considerably greater than the coherence length of the short laser, for example greater than about 10 times the coherence length.

Figure 2:
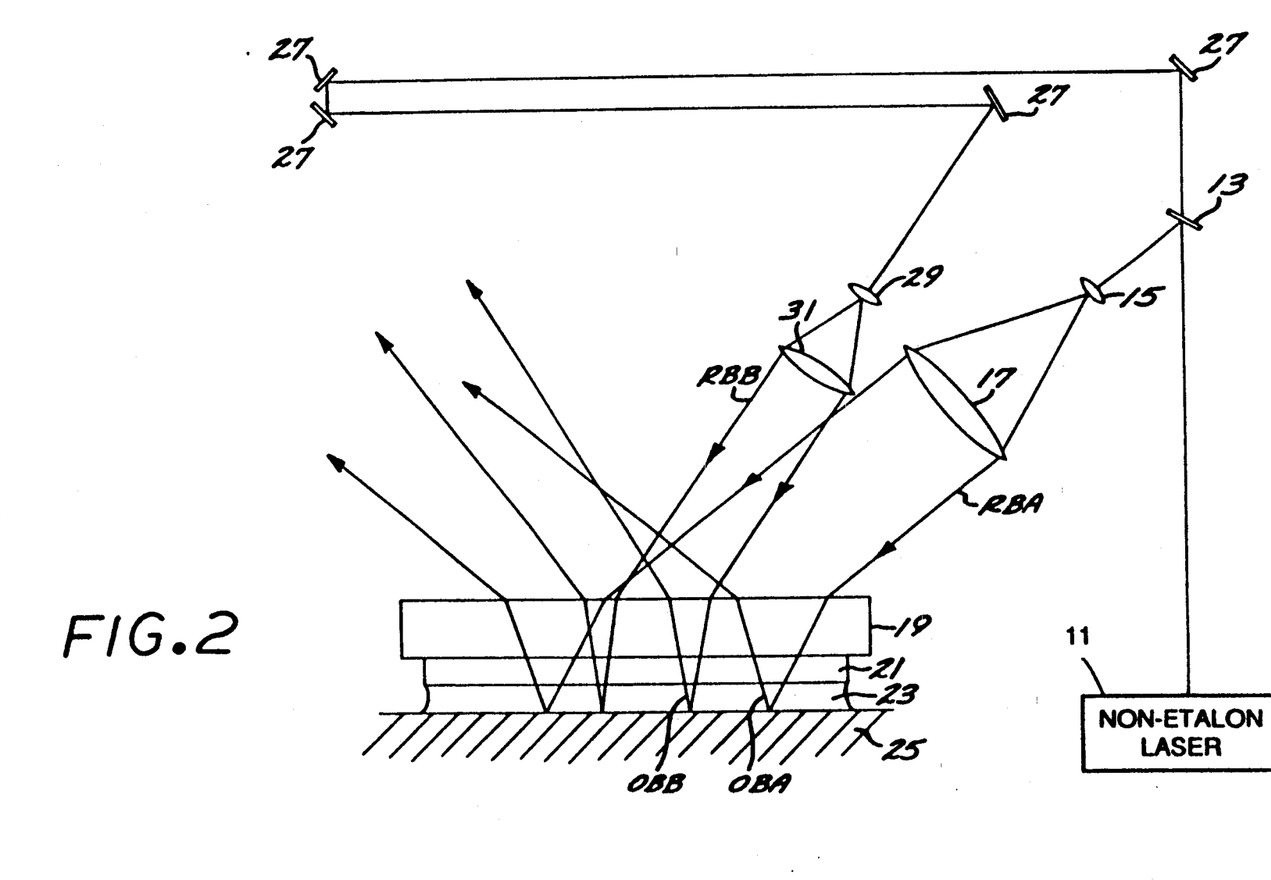
FIG. 2 schematically depicts an exposure set up for simultaneously exposing a plurality of reflection holograms which achieves coherence mismatch in accordance with the invention by path length mismatch.
Figure 3:
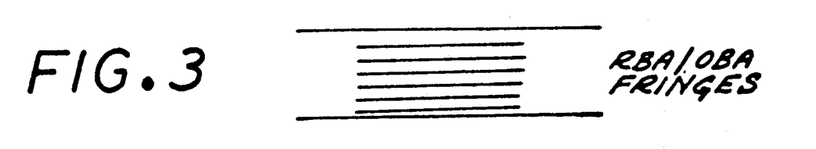
FIG. 3 schematically illustrates the holographic fringe pattern of one of the desired holograms produced with the exposure set up of FIG. 2.

Referring now to FIG. 2, schematically depicted therein is a mirror gate exposure set up in accordance with the invention which simultaneously exposes a plurality of reflection holograms in a single recording layer and achieves coherence mismatch by path length mismatch. The exposure set up includes a non-etalon laser source 11 that provides its output to a beam splitter 13 to produce a transmitted beam and a reflected beam. The reflected beam is directed to a spatial filter 15 that produces a diverging beam which is collimated by a collimating lens 17. The spatial filter 15 can comprise a microscope objective and a pinhole aperture located at its focus, in accordance with conventional techniques. The collimated beam produced by the collimating lens 17 comprises a reference beam RBA that passes through a substrate 19, a photopolymer hologram recording layer 21 that is supported on the side of a transparent substrate 21 that opposite the side of the substrate that receives the reference beam RBA, and a layer of index matching fluid 23 that is disposed between the hologram recording layer 21 and a first surface mirror 25. The first surface mirror 25 reflects a portion of the reference beam RBA to produce an object beam OBA that interferes with the reference beam RBA in the recording layer 21 to produce a first wanted hologram whose fringes are shown in FIG. 3.

Figure 4:
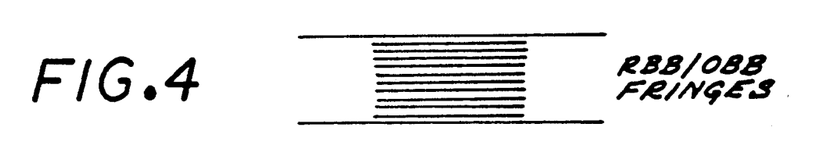
FIG. 4 schematically illustrates the holographic fringe pattern of one of the desired holograms produced with the exposure set up of FIG. 2.

The transmitted beam from the beamsplitter is relayed by a series of path length extending light bending elements 27 to a spatial filter 29 which produces a diverging beam that is collimated by a collimating lens 31. The collimated output of the collimating lens 31 comprises a reference beam RBB that passes through the substrate 19, the photopolymer hologram recording layer 21, and the layer of index matching fluid 23 to the first surface mirror 25. The first surface mirror 25 reflects a portion of the reference beam RBB to produce an object beam OBB that interferes with the reference beam RBB in the recording layer 21 to produce a second desired hologram whose fringes are shown in FIG. 4.

Figure 5:
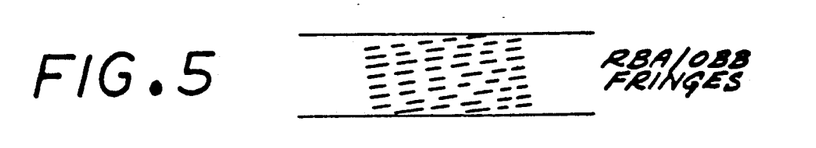
FIG. 5 schematically illustrates the holographic fringe pattern of one of the crosstalk holograms produced with the exposure set up of FIG. 2.
Figure 6:
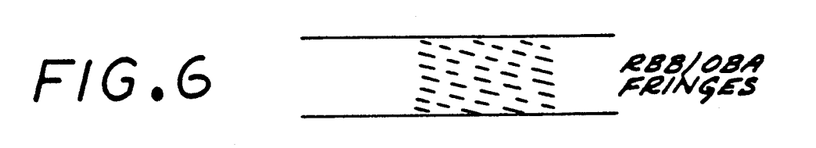
FIG. 6 schematically illustrates the holographic fringe pattern of further crosstalk holograms produced with the exposure set up of FIG. 2.
Figure 7:
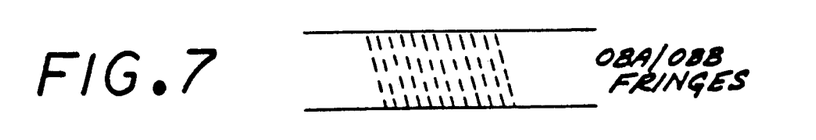
FIG. 7 schematically illustrates the holographic fringe pattern of another of the crosstalk holograms produced with the exposure set up of FIG. 2.
Figure 8:
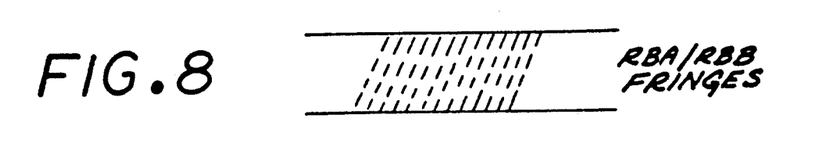
FIG. 8 schematically illustrates the holographic fringe pattern of yet another of the crosstalk holograms produced with the exposure set up of FIG. 2.

In the exposure system of FIG. 2, the desired hologram forming beam pairs (RBA, OBA) and (RBB, OBB) are configured such that the first beam and the second beam in each desired hologram forming beam pair are coherently matched across the hologram format, and the first beam and the second beam in each of the crosstalk hologram forming beam pairs (RBA, OBB), (OBA, RBB), (OBA, OBB), and (RBA, RBB) are coherently mismatched across the hologram format. In particular, as to each desired hologram forming beam pair, the path length or coherence mismatch between the first beam and the second beam of such pair is within the coherence length of the non-etalon laser source across the hologram recording format; and as to each crosstalk hologram forming beam pair, the path length mismatch between the first and second beams of such crosstalk hologram forming beam pair across the hologram format is in a region of the fringe contrast characteristic that is sufficiently low such that the resulting crosstalk hologram is of the desired low efficiency. For example, the mismatch can be within a low fringe contrast region of the fringe contrast characteristic of a long non-etalon laser, or sufficiently greater than the coherence length of a short non-etalon laser. The fringe patterns of the crosstalk holograms produced pursuant to the crosstalk hologram forming beam pairs are schematically depicted with broken lines in FIGS. 5-8 to indicate that such fringes have significantly less contrast than the desired hologram fringes shown in FIGS. 3 and 4. In particular, FIG. 5 shows the crosstalk hologram fringes that would otherwise be formed by the reference beam RBA and the object beam OBB; FIG. 6 shows the crosstalk hologram fringes that would otherwise be formed by the reference beam RBB and the object beam OBA; FIG. 7 shows the crosstalk hologram fringes that would otherwise be formed by the object beam OBA and the object beam OBB; and FIG. 8 shows the crosstalk hologram fringes that would otherwise be formed by the reference beam RBA and the reference beam RBB.

Figure 9:
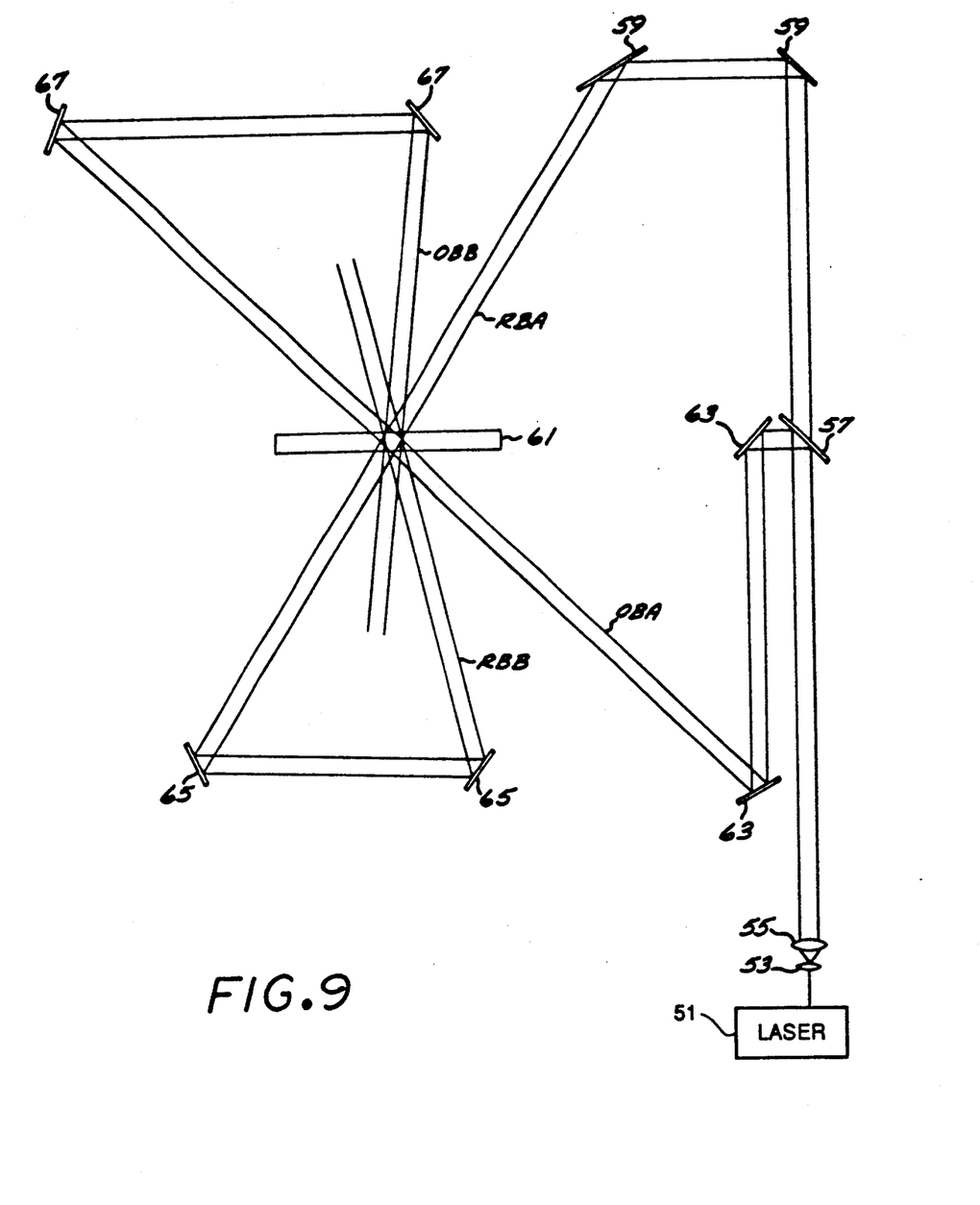
FIG. 9 schematically depicts an exposure set up for simultaneously exposing a plurality of transmission holograms which achieves coherence mismatch in accordance with the invention by path length mismatch.

Referring now to FIG. 9, schematically depicted therein is a simultaneous exposure set up in accordance with the invention which simultaneously exposes a plurality of transmission holograms in a single recording layer and achieves coherence mismatch by path length mismatch. The exposure set up includes a non-etalon laser source 51 that has a coherence length that is greater than the maximum path length mismatch between the first and second beams of each desired hologram forming beam pair. The output of the laser source 51 is directed to a spatial filter 53 which produces a diverging beam that is collimated by a collimating lens 55 to produce a collimated expanded beam. The expanded beam is split by a beam splitter 57 into a transmitted beam and a reflected beam.

The transmitted beam from the beam splitter 57 is relayed to a hologram recording layer 61 by light bending elements 59 and forms a reference beam RBA that interferes with an object beam OBA to form a first desired hologram. The object beam OBA is formed of the reflected beam produced by the beamsplitter 57 which is relayed to the hologram recording layer 61 by light bending elements 63.

In the exposure set up of FIG. 9, a reference beam RBB is formed of the portion of the reference beam RBA that is transmitted through the hologram recording layer 61 and relayed back to the hologram recording layer 61 by light bending elements 65. The reference beam RBB interferes in the hologram recording layer 61 with an object beam OBB to form a second desired hologram. The object beam OBB is formed of the portion of the object beam OBA that is transmitted through the hologram recording layer 61 and relayed back to the hologram recording layer 61 by light bending elements 67.

In the exposure system of FIG. 9, the desired hologram forming beam pairs (RBA, OBA) and (RBB, OBB) are configured such that the first beam and the second beam in each desired hologram forming beam pair are coherently matched across the hologram format, and the first beam and the second beam in each of the crosstalk hologram forming beam pairs (RBA, OBB), (OBA, RBB), (OBA, OBB), and (RBA, RBB) are coherently mismatched across the hologram format. In particular, as to each desired hologram forming beam pair, the path length or coherence mismatch between the first beam and the second beam of such desired hologram beam pair is within the coherence length of the non-etalon laser source across the hologram recording format; and as to each crosstalk hologram forming beam pair, the path length mismatch between the first and second beams of such crosstalk hologram forming beam pair across the hologram format is in a region of the fringe contrast characteristic that is sufficiently low such that the resulting crosstalk hologram is of the desired low efficiency. For example, the mismatch can be within a low fringe contrast region of the fringe contrast characteristic of a long non-etalon laser, or sufficiently greater than the coherence length of a short non-etalon laser.

Figure 10:
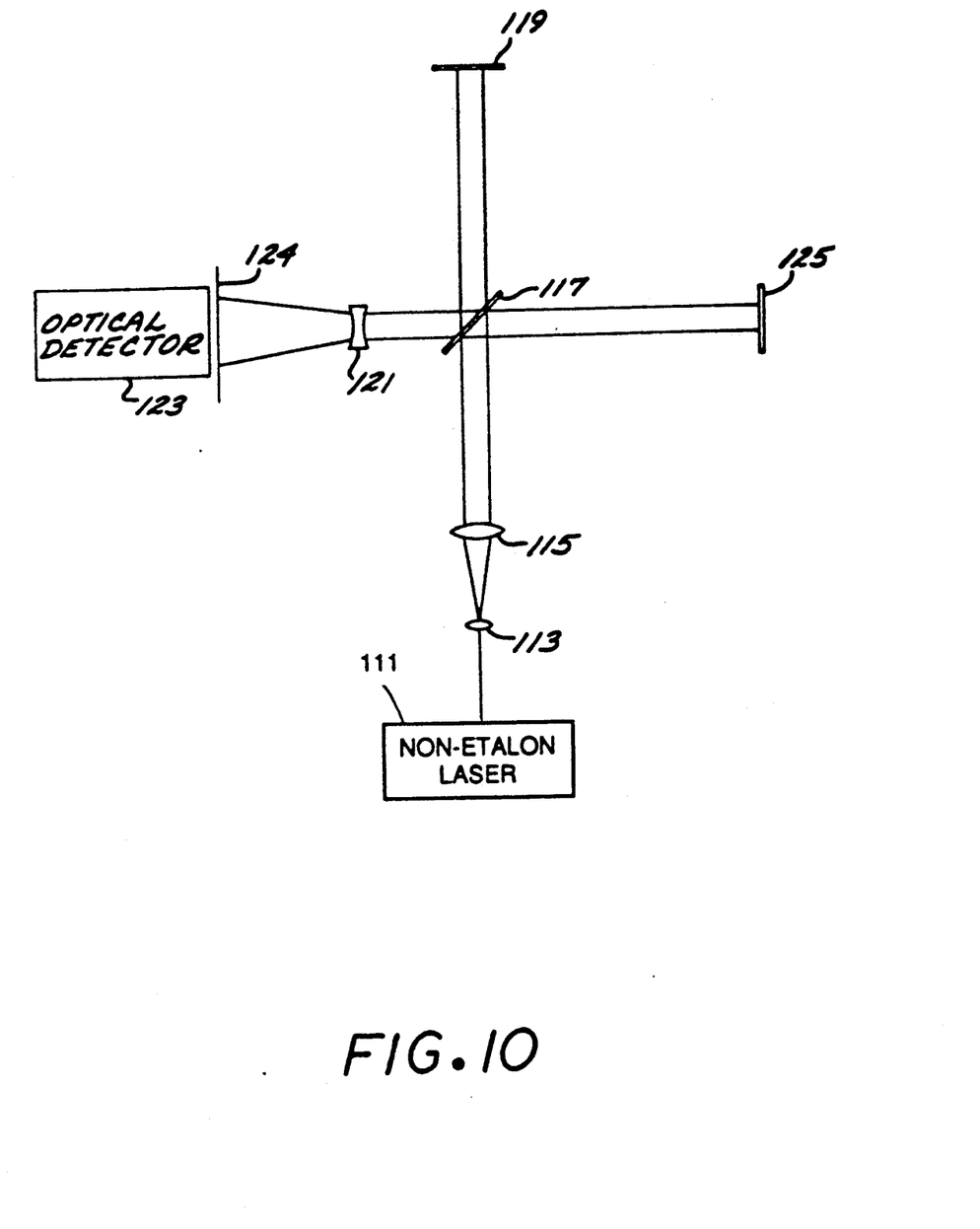
FIG. 10 schematically depicts an interferometer arrangement that is useful in determining the amount of mismatch required between the hologram beams of different holograms that are recorded in accordance with the invention.

Referring now to FIG. 10, set forth therein is a conventional interferometer which can be utilized to determine the fringe contrast characteristic of a non-etalon laser 111 that is to be utilized in implementing the invention by path length mismatch as described above. The interferometer includes the non-etalon laser source 111 to be utilized for exposure, a spatial filter 113, a collimating lens 115, and a beam splitter 117 that is at a 45 degree angle to the axis of the expanded beam output of the collimating lens. The beam splitter provides a first transmitted beam to a fixed mirror 119 that is at 90 degrees to the axis of the expanded laser beam. The fixed mirror 119 reflects the first transmitted beam back to the beam splitter which reflects a portion of the reflected first transmitted beam to a dispersing lens 121. The beam splitter 117 further provides a first reflected beam to a positionable mirror 125 that is parallel to the axis of the expanded laser beam and is positionable along the axis of the first reflected beam. The fixed mirror 119 reflects the first reflected beam back to the beam splitter which transmits a portion of the reflected first reflected beam to the optical the dispersing lens 121 whose output therefore comprises two beams having path lengths that differ by twice the difference between (a) the distance from the beam splitter 117 to the fixed mirror 119 and (b) the distance from the beam splitter 117 to the positionable mirror 125. The output of the dispersing lens 121 is received by a scannable optical detector 123 via an aperture 124 which allows the scannable optical detector 123 to detect one interference fringe at a time. In use, fringe contrast is determined for each of different positions of the positionable mirror by sampling different portions of the fringe pattern for a given mirror position and determining the difference between the maximum and minimum intensities of such fringe pattern.

Figure 11:
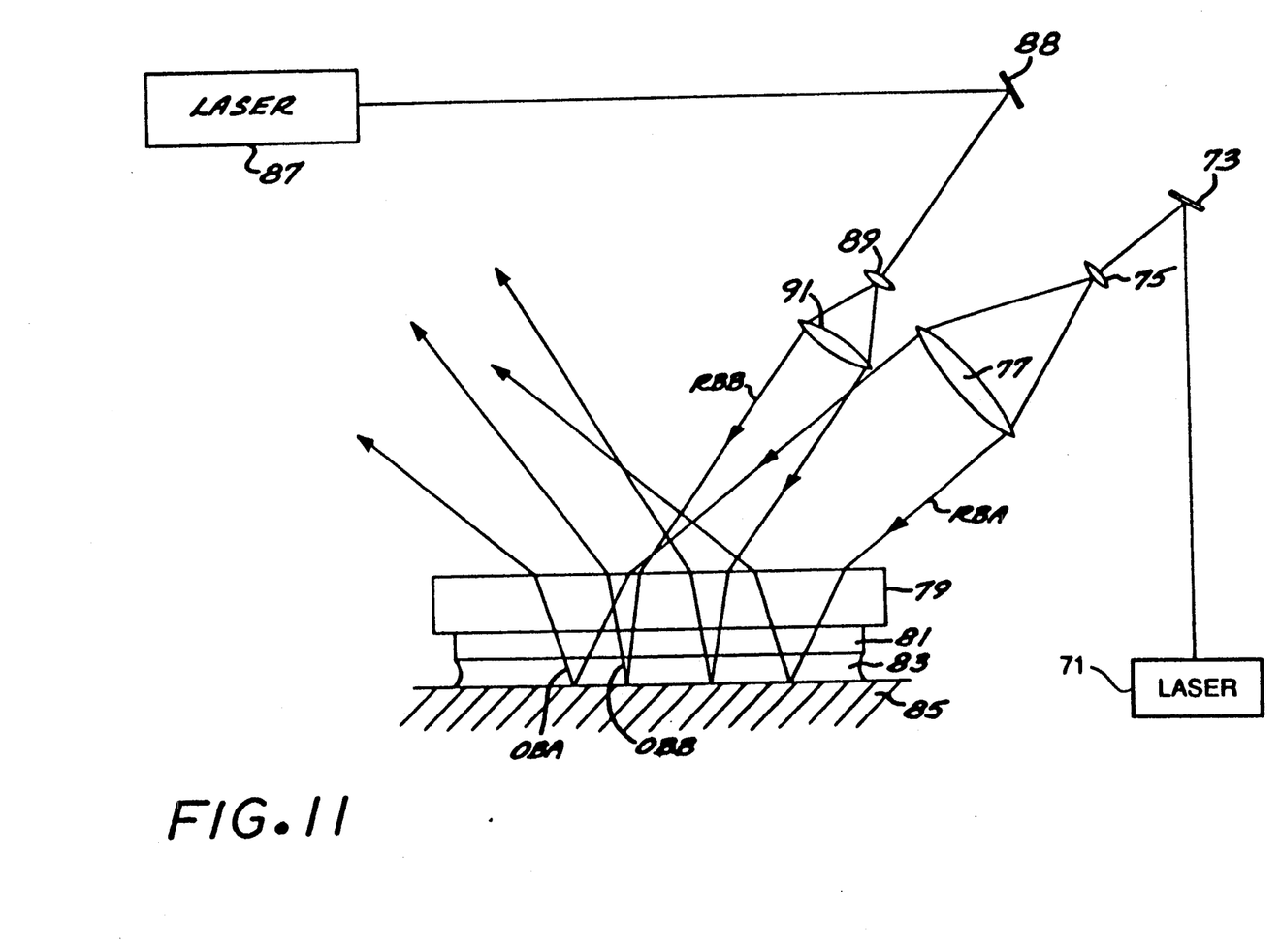
FIG. 11 schematically depicts an exposure set up for simultaneously exposing a plurality of reflection holograms which achieves coherence mismatch in accordance with the invention by utilization of a separate laser source for exposure of each hologram.

Referring now to FIG. schematically depicted therein is a mirror gate simultaneous exposure set up in accordance with the invention which simultaneously exposes a plurality of reflection holograms in a single recording layer and achieves coherence mismatch by using a separate laser, which can be an laser containing an etalon within its cavity, for producing each desired hologram forming beam pair. The exposure set up is similar to that of FIG. 2 and includes a first laser source 71 whose output beam is directed by a light bending element 73 to a spatial filter 75 that produces a diverging beam which is collimated by a collimating lens 77. The spatial filter 75 can comprise a microscope objective and a pinhole aperture located at its focus, in accordance with conventional techniques. The collimated beam produced by the collimating lens 77 comprises a reference beam RBA that passes through a transparent substrate 79, a photopolymer hologram recording layer 81 that is supported on the side of the transparent substrate 79 that is opposite the side of the substrate that receives the reference beam RBA, and a layer of index matching fluid 83 that is disposed between the hologram recording layer 81 and a first surface mirror 85. The first surface mirror 85 reflects a portion of the reference beam RBA to produce an object beam OBA that interferes with the reference beam RBA in the recording layer 81 to produce a first desired hologram.

The exposure system of FIG. further includes a second laser source 87 that is of the same wavelength as the first laser source 71. The output of the second laser source 87 is directed via a light bending element 88 to a spatial filter 89 which produces a diverging beam that is collimated by a collimating lens 91. The collimated output of the collimating lens 91 comprises a reference beam RBB that passes through the substrate 79, the photopolymer hologram recording layer 81, and the layer of index matching fluid 83 to the first surface mirror 85. The first surface mirror 85 reflects a portion of the reference beam RBB to produce an object beam OBB that interferes with the reference beam RBB in the recording layer 81 to produce a second desired hologram.

In the exposure system of FIG. 11, the desired hologram forming beam pairs (RBA, OBA) and (RBB, OBB) are configured such that the first beam and the second beam in each desired hologram forming beam pair are coherently matched across the hologram format. Such coherence match is achieved by maintaining the path length mismatch of the first beam and the second beam of each desired hologram forming beam pair within the coherence length of the originating laser source. If the originating laser source is a laser having an etalon within its cavity, such coherence length is relatively large, which allows coherence match to be maintained with a relatively large path length mismatch. Coherence mismatch between the first beam and the second beam in each of the crosstalk hologram forming beam pairs (RBA, OBB), (OBA, RBB), (OBA, OBB), and (RBA, RBB) is achieved by the use of the separate laser sources, whereby the first and second beams in a crosstalk hologram originates from different laser sources.

Figure 12:
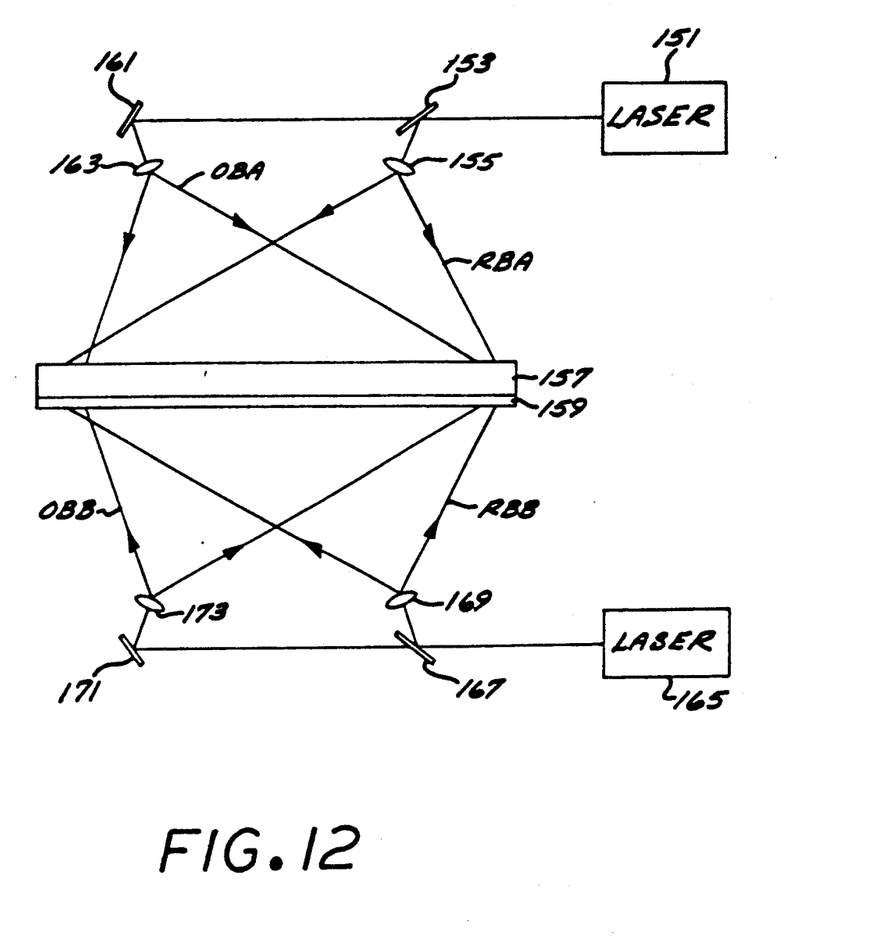
FIG. 12 schematically depicts an exposure set up for simultaneously exposing a plurality of transmission holograms which achieves coherence mismatch in accordance with the invention by utilization of a separate laser source for exposure of each hologram.

Referring now to FIG. 12, schematically set forth therein is a simultaneous exposure system in accordance with the invention which simultaneously exposes a plurality of reflection holograms in a single recording layer and which achieves coherence mismatch by using a separate laser, which can be a laser having an etalon within its cavity, for producing each desired hologram forming beam pair. The exposure system includes a first laser source 151 whose output which is directed to a beam splitter 153 that provides a transmitted beam and a reflected beam. The reflected beam output of the beam splitter 153 is received by a spatial filter 155 which produces a diverging reference beam RBA that passes through a substrate 157 and enters a hologram recording layer 159 supported thereby. The transmitted beam output of the beamsplitter 153 is directed by a light bending element 161 to a spatial filter 163 which produces a diverging object beam OBA that passes through the substrate and enters the hologram recording layer 159. The reference beam RBA and the object beam OBA interfere in the hologram recording layer to form hologram fringes for a first desired hologram.

The exposure system of FIG. 12 further includes a second laser source 165 that is of the same wavelength as the first laser source 151. The output of the second laser source 165 is directed to a beam splitter 167 which provides a reflected beam and a transmitted beam. The reflected beam output of the beamsplitter 167 is received by a spatial filter 169 which produces a diverging reference beam RBB that enters the hologram recording layer 159 from the non-substrate side thereof.

The transmitted beam output of the beam splitter 167 is directed by a light bending element 171 to a spatial filter 173 which produces a second diverging object beam OBB that enters the hologram recording layer 159 from the non-substrate side thereof. The reference beam RBB and the object beam OBB interfere in the hologram recording layer to form hologram fringes for a second desired hologram.

In the exposure system of FIG. 12, the desired hologram forming beam pairs (RBA, OBA) and (RBB, OBB) are configured such that the first beam and the second beam in each desired hologram forming beam pair are coherently matched across the hologram format. Such coherence match is achieved by maintaining the path length mismatch of the first beam and the second beam of each desired hologram forming beam pair within the coherence length of the originating laser source. If the originating laser source is a laser having an etalon within its cavity, such coherence length is relatively large, which allows coherence match to be maintained with a relatively large path length mismatch. Coherence mismatch between the first beam and the second beam in each of the crosstalk hologram forming beam pairs (RBA, OBB), (OBA, RBB), (OBA, OBB), and (RBA, RBB) is achieved by the use of the separate laser sources, whereby the first and second beams in each crosstalk hologram originates from different laser sources.

While the foregoing illustrative examples of exposure systems in accordance with the invention have been directed to the simultaneous exposure of two holograms in a single layer, the invention contemplates simultaneous exposure of a greater number of holograms, with the limit on the number of simultaneously exposed holograms being determined by factors including the physical space required for implementation of the exposure system, the acceptable minimum brightness for each hologram, and the repetitive nature of the coherence curve pursuant to which the path length difference between the first and second beams of a crosstalk hologram beam pair may be close enough to an integral number of cycles.

The foregoing has been a disclosure of techniques for simultaneously exposing a plurality of holograms in a single recording layer which reduce interaction between desired hologram forming beam pairs, and is advantageously utilized with photopolymer recording materials, as well as other hologram recording materials. Simultaneous exposure in accordance with the invention reduces the complexity and cost of multiple hologram optical elements, and produces very clean and efficient multiple hologram optical elements. The multiple holograms simultaneously exposed in accordance with the invention can be configured to provide broader hologram bandwidths, or they can be unrelated. The disclosed techniques are also advantageously utilized to produce a "beat" or Moire holograms which is of a longer wavelength such as infra-red, and is present as long as two holograms co-exist in the same hologram recording layer. Such longer wavelength holograms cannot be produced by direct exposure, and have been made in silver halide and DCG by sequential exposures, but not with photopolymer materials which are not amenable to sequential exposures. The sequential exposures in DCG required calculations and/or experimental iterations to compensate for variable shrinkage between exposures. Pursuant to the invention, "beat" holograms can be formed by simultaneous exposures in photopolymer materials, silver halide, and DCG, wherein the shrinkage compensation calculations or experimental iterations for DCG are eliminated.

Although the foregoing has been a description and illustration of specific embodiments of the invention, various modifications and changes thereto can be made by persons skilled in the art without departing from the scope and spirit of the invention as defined by the following claims.

What is claimed is:

1. A method for simultaneously exposing a plurality of holograms in a holographic recording layer pursuant to plurality of beams that originate from a single laser source, wherein each hologram is formed pursuant to interference between two beams at a plurality of interference locations and has an associated efficiency, and wherein each point of interference between two beams has an associated path length difference that is the difference between (i) the path length of one of the interfering beams from the laser to the point of interference and (ii) the path length of the other interfering beam from the laser to the point of interference, the method comprising the steps of:

illuminating the holographic recording layer with a first reference beam and a first object beam that (a) originate from a laser, (b) interfere in the holographic recording layer at a plurality of first hologram interference locations, and (c) are matched in path length such the path length difference for each first hologram interference location is less than the coherence length of the originating laser, whereby the first reference beam and the first object beam interfere coherently; and illuminating the holographic recording layer with a second reference beam and a second object beam that (a) originate from the same laser as the first reference beam and the first object beam, (b) interfere in the holographic recording layer at a plurality of second hologram interference locations, (c) are matched in path length such that the path length difference for each second hologram interference location is less than the coherence length of the originating laser, whereby the second reference beam and the second object beam interfere coherently, and (d) are mismatched in path length relative to the first reference beam and the first object beam so as to reduce the respective efficiencies of crosstalk holograms to be less than a desired level, wherein crosstalk holograms are formed by interference at crosstalk interference locations of (1) the first reference beam with the second object beam, (2) the first object beam with the second reference beam, (3) the first object beam with the second object beam, and (4) the first reference beam with the second reference, and wherein the path length mismatch is achieved by providing path length differences for all crosstalk interference locations that are sufficiently greater than the coherence length of the originating laser to achieve the desired reduced efficiency of the crosstalk holograms.

2. A hologram exposure system for simultaneously exposing a plurality of holograms in a holographic recording layer pursuant to plurality of beams that originate from a single laser, wherein each hologram is formed pursuant to interference between two beams at a plurality of interference locations and has an associated efficiency, and wherein each point of interference between two beams has an associated path length difference that is the difference between (i) the path length of one of the interfering beams from the laser to the point of interference and (ii) the path length of the other interfering beam from the laser to the point of interference, comprising:

a laser for providing a laser output having a coherence length;

first optical means responsive to said laser output for providing a first reference beam and a first object beam that interfere in the holographic recording layer at a plurality of first hologram interference locations, said first reference beam and said first object beam being matched in path length wherein the path length difference for each first hologram interference location is less than the coherence length of said laser output, whereby the first reference beam and the first object beam interfere coherently;

second optical means responsive to said laser output for providing a second reference beam and a second object beam that interfere in the holographic recording layer at a plurality of second hologram interference locations, said second reference beam and said second object beam being matched in path length wherein the path length difference for each second hologram interference location is less than the coherence length of said laser output, whereby the second reference beam and the second object beam interfere coherently;

said first and second optical means configured such that said first reference and object beams are sufficiently mismatched in path length relative to said second reference and object beams so as to reduce the efficiencies of crosstalk holograms to be less than a desired level, wherein crosstalk holograms are formed by interference, at crosstalk interference locations, of (1) the first reference beam with the second object beam in the hologram recording layer, (2) the first object beam and the second reference beam in the holographic recording layer, (3) the first object beam and the second object beam in the holographic recording layer, and (4) the first reference beam with the second reference beam in the holographic recording layer, and wherein the path length mismatch is achieved by providing path length differences for all crosstalk interference locations that are sufficiently greater than the coherence length of the originating laser to achieved the desired reduction in efficiencies of the crosstalk holograms.

* * * * *